(12) United States Patent
Crowe et al.

(10) Patent No.: US 9,911,180 B2
(45) Date of Patent: Mar. 6, 2018

(54) COMPUTATIONAL IMAGING WITH UNCALIBRATED PUPIL PHASE

(71) Applicant: Raytheon Company, Waltham, MA (US)

(72) Inventors: Devon G. Crowe, Tucson, AZ (US); Caleb Knoernschild, Mckinney, TX (US)

(73) Assignee: Raytheon Company, Waltham, MA (US)

( * ) Notice: Subject to any disclaimer, the term of this patent is extended or adjusted under 35 U.S.C. 154(b) by 137 days.

(21) Appl. No.: 15/090,029

(22) Filed: Apr. 4, 2016

(65) Prior Publication Data

US 2017/0287118 A1    Oct. 5, 2017

(51) Int. Cl.
| | | |
|---|---|---|
| *G06K 9/40* | (2006.01) | |
| *G06T 5/00* | (2006.01) | |
| *G06T 3/40* | (2006.01) | |
| *G01J 9/00* | (2006.01) | |
| *G02B 26/06* | (2006.01) | |

(52) U.S. Cl.
CPC .............. *G06T 5/003* (2013.01); *G01J 9/00* (2013.01); *G02B 26/06* (2013.01); *G06T 3/4069* (2013.01)

(58) Field of Classification Search
CPC .............................. G06T 3/4069; G06T 5/003
USPC ....................................................... 382/255
See application file for complete search history.

(56) References Cited

U.S. PATENT DOCUMENTS

| | | | |
|---|---|---|---|
| 5,841,911 A | 11/1998 | Kopeika et al. | |
| 8,350,948 B2 | 1/2013 | Miyauchi et al. | |
| 9,013,590 B2 | 4/2015 | Richards | |
| 2006/0285002 A1* | 12/2006 | Robinson ............. | H04N 5/2251 348/335 |
| 2010/0044555 A1* | 2/2010 | Ohara .................... | G02B 27/46 250/216 |
| 2014/0105515 A1 | 4/2014 | Zhu et al. | |
| 2014/0168458 A1 | 6/2014 | Richards | |

FOREIGN PATENT DOCUMENTS

| | | |
|---|---|---|
| WO | 200165489 A2 | 9/2001 |
| WO | 2011033287 A1 | 3/2011 |

OTHER PUBLICATIONS

Korff, "Analysis of a method for obtaining near-diffraction-limited information in the presence of atmospheric turbulence," Journal of the Optical Society of America, Aug. 1973.

(Continued)

*Primary Examiner* — Manuchehr Rahmjoo
(74) *Attorney, Agent, or Firm* — Burns & Levinson LLP; Joseph M. Maraia

(57) ABSTRACT

Systems and methods are disclosed for improving image quality by modifying received radiation wavefronts with one or more uncalibrated variable phase plates at the pupil plane of the optical system, to produce an atmospheric-like blurred image on the focal plane with an effective increase in the sampling parameter Q. Real-time image restoration algorithms may then be applied to data sets sampled from the blurred image formed on the detector array. Numerous phase plate embodiments are provided for modifying the wavefront.

39 Claims, 8 Drawing Sheets

(56) References Cited

OTHER PUBLICATIONS

Carmen J. Carrano, "Speckle imaging over horizontal paths", High-Resolution Wavefront Control: Methods, Devices and Applications IV, Proceedings of SPIE vol. 4825 (2002).
Ashok et al., "Pseudorandom phase masks for super-resolution imaging from subpixel shifting", Applied Optics, May 2007.
Ayers et al., "Knox-Thompson and triple-correlation imaging through atmospheric turbulence", J. Opt. Soc. Am. A, vol. 5, No. 7/Jul. 1988.
International Search Report and Written Opinion from related PCT Application No. PCT/US2016/062710 dated Mar. 2, 2017.

* cited by examiner

COMPUTATIONAL IMAGING WITH UNCALIBRATED PUPIL PHASE

U.S. GOVERNMENT INTEREST

There is no U.S. Government ownership or other interest in the invention(s) described and claimed herein.

FIELD

This invention relates to computational imaging using a combination of an un-calibrated phase plate and post processing, and in particular methods and systems for computationally efficient improvement of the focal plane image sampling parameter Q, also referred to as super-resolution.

BACKGROUND

Imaging system design using focal plane detector arrays is becoming ubiquitous, and the image formation burden is increasingly shared between the optical train and digital processing of the raw detector array data. Imaging system resolution, focal plane array sampling, and field of view are a function of the imaging sampling parameter Q, where Q=λ*(focal ratio)/(detector element size). The degree of spreading (blurring) of the image of a point source is a measure for the quality of an imaging system. Current practice is frequently to settle for less than the desired imaging performance when the system parameters exceed those attainable by a Q=1 system, and to accept the pixel-limited image sampling resolution of available focal plane detector array imagers.

In a detector element size-limited optical system (Q<1), Mark Neifeld and Amit Ashok successfully increased the system sampling by improving Q by a factor of three (as described in "Pseudorandom Phase Masks for Super-resolution Imaging from Subpixel Shifting", *Applied Optics*, May 2007, the contents of which are hereby incorporated by reference.) However, the approach required significant tuning of a nonlinear iterative algorithm to a carefully calibrated phase plate, operations too cumbersome in practice and resource-intensive to have yet found wide application in deployed systems.

Thus, what is needed is a fast (e.g., real-time), single-pass phase-closure method and apparatus that overcomes pixel-limited performance to increase the effective sampling by an optical system to achieve a higher sampling parameter Q.

BRIEF SUMMARY

In accordance with examples described below, methods of and systems for improving the resolution of focal plane sampling limited imaging systems are disclosed. In one example, an uncalibrated variable phase plate is used to modify an optical radiation wavefront to intentionally introduce a controllable blur to an image formed on a detector array. Then, digital signal processing is used to recover sub-pixel information from the blurred image formed on the pixel array detector.

In an embodiment, an optical system and method of using the optical system is disclosed, where the system includes a pupil plane and a pixel array detector positioned at a focal plane, and where the system is initially under-sampling an image. That is, the optical system image quality is at best diffraction limited, having a sampling parameter Q that is less than or equal to the Nyquist value of 1, such that aliasing is a concern. The optical radiation wavefront received at an entrance aperture of the optical imaging system propagates to and is modified by at least one uncalibrated variable phase plate positioned at the pupil plane. The phase plate may modify the wavefront with a blurring function approximating atmospheric blur, so as to produce a blurred image on the focal plane with an effective increase in the sampling parameter Q. The blurred imaged may then be sampled with a pixel array detector positioned at the focal plane, in order to produce a sampled data set, A real-time image restoration algorithm may then be applied to the sampled data set to produce an unblurred image with higher effective sampling parameter Q. The real-time restoration algorithm may comprise a bispectral image restoration algorithm, or similar algorithm. In various embodiments, the uncalibrated variable phase plate may be electronically varied or mechanically actuated.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. For purposes of clarity, not every component may be labeled in every figure. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise. Embodiments disclosed herein may be combined with other embodiments in any manner consistent with at least one of the principles disclosed herein, and references to "an embodiment," "an implementation," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWING

The foregoing and other objects, features and advantages will be apparent from the following more particular description of the examples, as illustrated in the accompanying drawings in which like reference characters refer to the same parts throughout the different views. In the annexed drawings, which are not necessarily to scale, emphasis instead being placed upon illustrating the principles of the examples.

DETAILED DESCRIPTION

Figure 1:
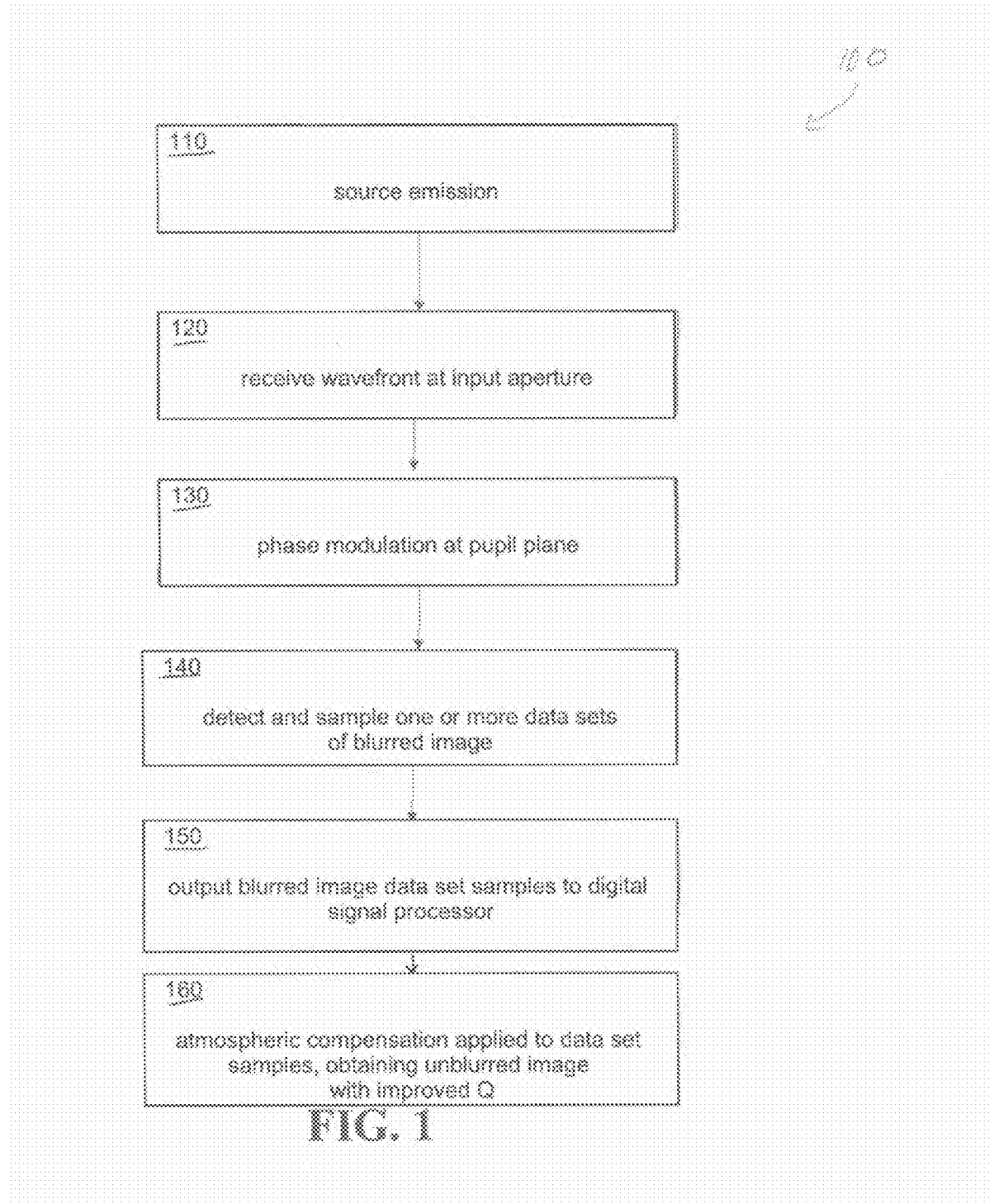
FIG. 1 is a flow diagram of an exemplary method in accordance with an embodiment.

In the description that follows, like components have been given the same reference numerals, regardless of whether they are shown in different examples. To illustrate an example(s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

As the term is used herein "atmospheric distortion" includes optical distortion arising from the turbulent air motion that drives variations in index of refraction. These optical distortions can be modeled and predicted using theories such as that developed by A. N. Kolmogorov, V. I. Tatarskii, and D. L. Fried (Roggermann and Welsh, *Imaging through Turbulence*, CRC Press, Boca Raton, Fla., 2006, the contents of which are hereby incorporated by reference in their entirety.)

Aspects and embodiments are directed to methods and systems for improving the sampling parameter Q in a detector array that involves modulating an optical radiation wavefront at an imaging system pupil plane. According to one embodiment, the modulation causes the point spread function of the lens to be deliberately blurred and spread over multiple pixels of the detector. Sub-detector information may be recovered by correlation filtering, as discussed in more detail below.

Figure 2:
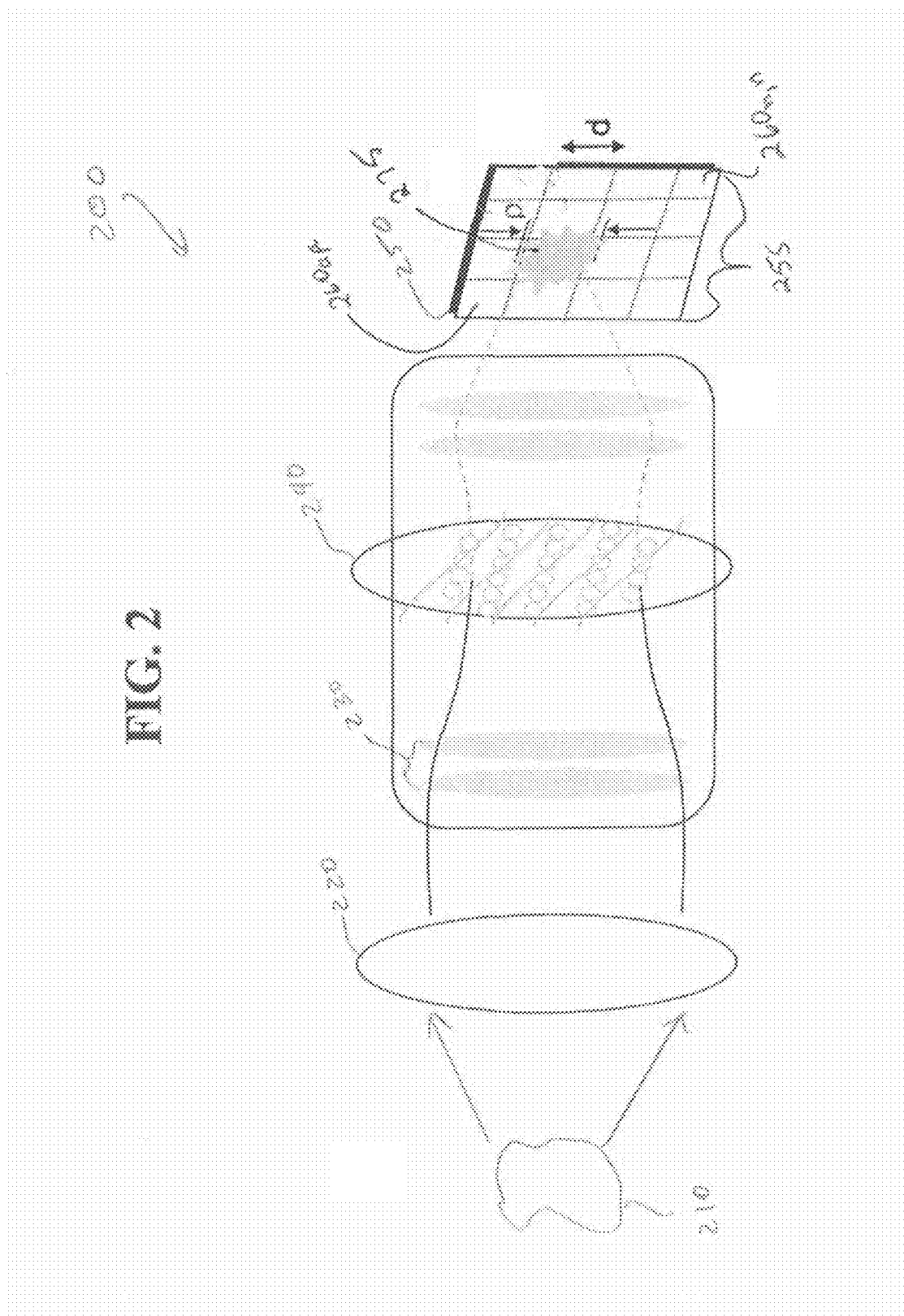
FIG. 2 is a schematic diagram of a portion of an exemplary apparatus in accordance with an embodiment.

Referring to FIGS. 1 and 2, there are illustrated examples of a flow diagram of a method 100 and an imaging system 200 for improving the sampling parameter Q of the optical imaging system. Electromagnetic radiation (e.g., optical radiation) is emitted (Step 110) from a source 210 and received (Step 120) at an entrance aperture 220. The radiation wavefront may pass through other optics 230 before being modified (Step 130) by an uncalibrated variable phase plate 240 positioned at the pupil plane of the imaging system 200. Phase plate 240 represents an optical element that imparts a local spatially dependent optical path length change, which can be equated to a local, spatially dependent change in the phase of the wavefront. Phase plate 240 may advantageously be uncalibrated, in that it not required to have been thoroughly characterized in using coherent measurements of phase variations introduced into the wavefront for use with an image restoration algorithm. Uncalibrated phase plates are typically manufactured with wide performance specifications and little to no data characterizing their use in image restoration applications. Phase modulation at phase plate 240 is preferred because it does not attenuate the optical radiation wavefront. The modified optical radiation wavefront then proceeds to illuminate an imaging detector 250 which is positioned at the focal plane of the imaging system 200. The imaging detector 250 may comprise a focal plane array detector, or other array of elements $260_{a,a}$ through $260_{n,n}$. Each of the elements $260_{a,a}$ through $260_{n,n}$ in the array 255 may correspond to one pixel in an image of the source 210. Aspects and embodiments are directed to methods of deliberately blurring the point spread function associated with the lens to effectively sub-divide the array 255 of elements $260_{a,a}$ through $260_{n,n}$ to increase the sampling parameter Q beyond diffraction limited optical capabilities (also referred to as "super-resolution".)

Figures 3A, 3B:
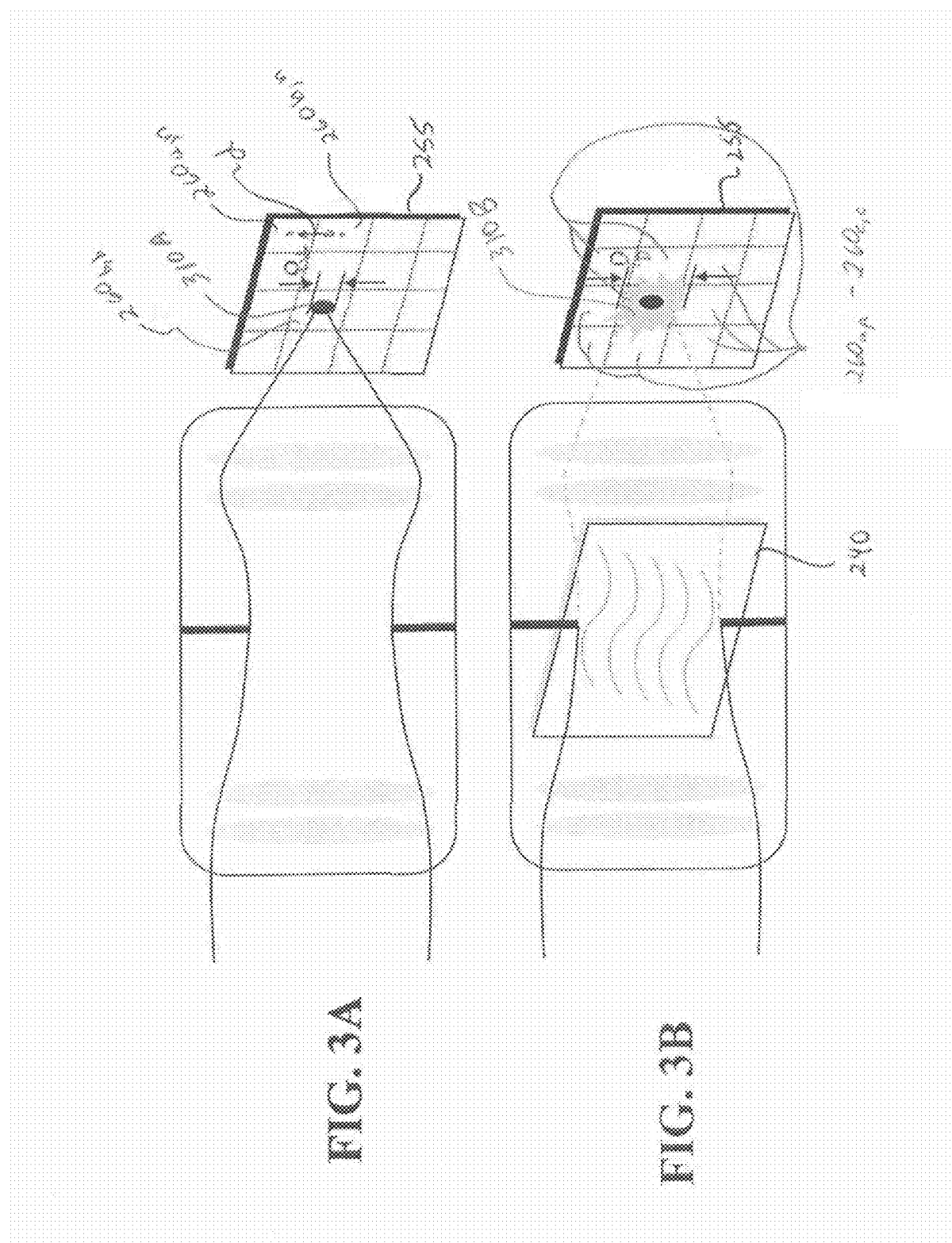
FIGS. 3A and 3B are, respectively, schematic diagrams portions of optical systems configured without and with an uncalibrated variable phase plate in accordance with an embodiment.

With reference to FIGS. 3A and 3B, an effect of image blurring on sampling parameter Q is illustrated. In FIG. 3A, without phase modification, an undisturbed optical system may be under-sampled at the detector array 255, where the pixel pitch d, representing the distance between the centers of detector elements (e.g, between the centers of array elements $260_{a,a}$ and $260_{b,n}$) is larger than under-sampled point spread function diameter $\rho_u$. Embodiments of the apparatus and methods described herein introduce distortion in the image at the detector array 255, which causes blurring and expansion of the point spread function to point spread function diameter $\rho_d$, which may be the same size or larger than the pixel pitch d. According to certain embodiments, the wavefront of the incoming optical radiation wavefront is blurred at pupil plane by the uncalibrated variable phase plate 240. This causes the point spread function of the lens to be deliberately distorted (from point source patch 310A to blurred and spread patch 310B) and information from the point spread function, rather than being distributed in a single array element $260_{b,b}$ (e.g., pixel), may be distributed over many surrounding detector array elements, for example over array elements $260_{a,a}$ through $260_{c,c}$. This approach may be expanded to any desired array size, and is not limited to square arrays as illustrated. Sub-pixel information, or information below the resolution of the detector array, may be recovered by correlation filtering, as discussed further below. The blurred image produced at the focal plane is modified by the uncalibrated variable phase plate 240 such that the "true" image is convolved with a blurring function induced by the uncalibrated variable phase plate 240.

The blurring function can be represented using Fried's well known long exposure or short exposure transfer function (Welsh, *Imaging through Turbulence*, CRC Press, 2006). In these models, the blurring function is dependent on the Fried parameter $r_o$ which represents the diameter of a circular area within which phase errors are on the order of 1 radian. The Fried parameter is used as an input into the image restoration algorithm.

The image restoration algorithm relies a Fourier magnitude estimation and a speckle image phase reconstruction algorithm. There are a variety of well-known techniques to estimate or measure the Fourier magnitude. One embodiment uses the square root of the ratio of a Power Spectrum and a Labeyrie-Korff transfer function (Korff, "Analysis of a method for obtaining near-diffraction-limited information in the presence of atmospheric turbulence," Journal of the Optical Society of America, August 1973, the contents of which are hereby incorporated by reference). Although a variety of speckle image phase reconstruction algorithms may be employed, in certain real-time embodiments, a bispectrum algorithm is used such as described in the work of Lawrence, et al. "Speckle imaging of satellites at the U.S. Air Force Maui Optical Station" in Applied Optics, October 1992, the contents of which are hereby incorporated by reference. In this algorithm, the object's phase spectrum is found by solving the following equation:

$$\arg|O(\vec{r}+\vec{v})|=\arg|O(\vec{u})|+\arg|O(\vec{v})|-\arg\langle I_{B,n}(\vec{u},\vec{v})\rangle_n| \qquad \text{Eqn. 1}$$

where the image bispectrum is defined as:

$$I_{B,n}(\vec{u},\vec{v})=I_n(\vec{u})I_n(\vec{v})I_n(-\vec{u}-\vec{v}) \qquad \text{Eqn. 2}$$

In the above equations, $\vec{u}$ and $\vec{v}$ are 2 dimensional spatial frequency vectors, O is the Fourier transform of the object, and $I_n$ is the Fourier transform of the nth member of a set of the images.

Figure 4:
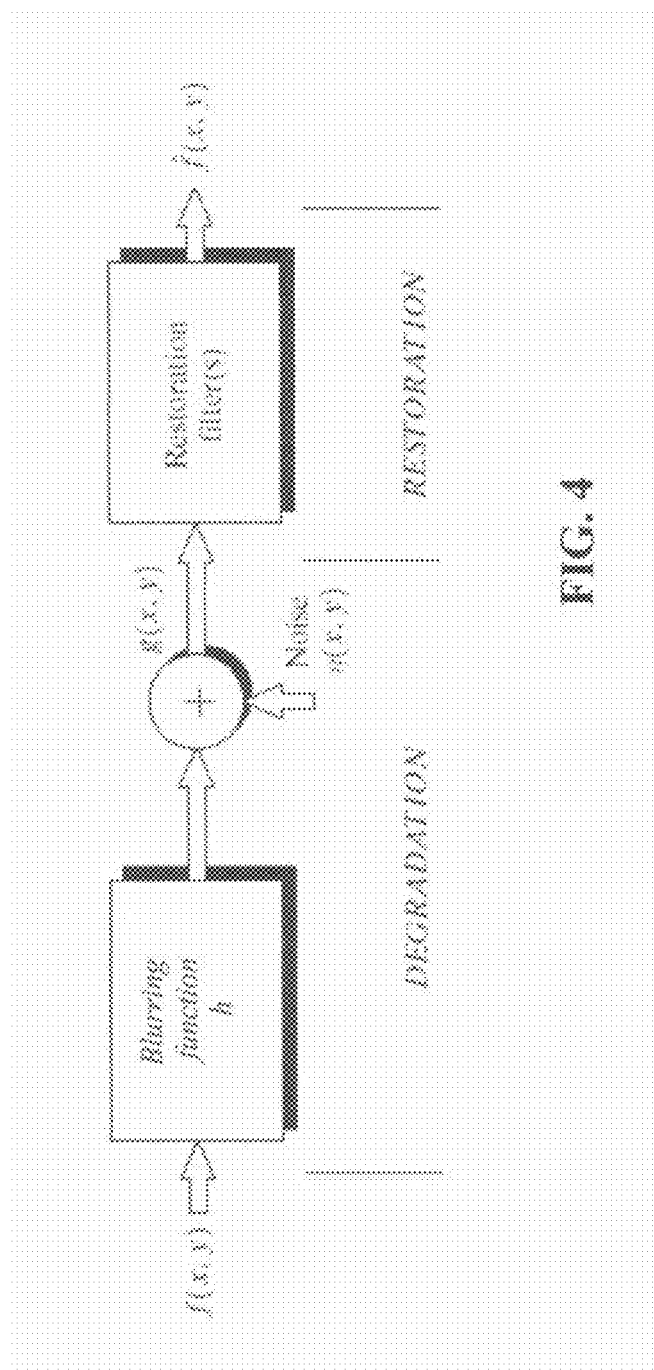
FIG. 4 is a functional, high-level block diagram of an image blurring and restoration process.

FIG. 4 illustrates a model of an exemplary image blurring (or "degradation") and restoration process, wherein for an image f with dimensions X×Y, and blurring function h with dimensions m×n, the blurred waveform can be represented as:

$$g(x, y) = h(x, y) * f(x, y) = \sum_{i=-a}^{a} \sum_{j=-b}^{b} h(i, j) f(x+i, y+j) \quad \text{Eqn. 3}$$

(neglects noise)]

The blurring function H preferably approximates atmospheric blurring such as described above. Triple correlation bispectral techniques were first applied in X-ray crystallography, then later developed for the restoration of atmospherically degraded astronomical imaging.

Figure 5A:
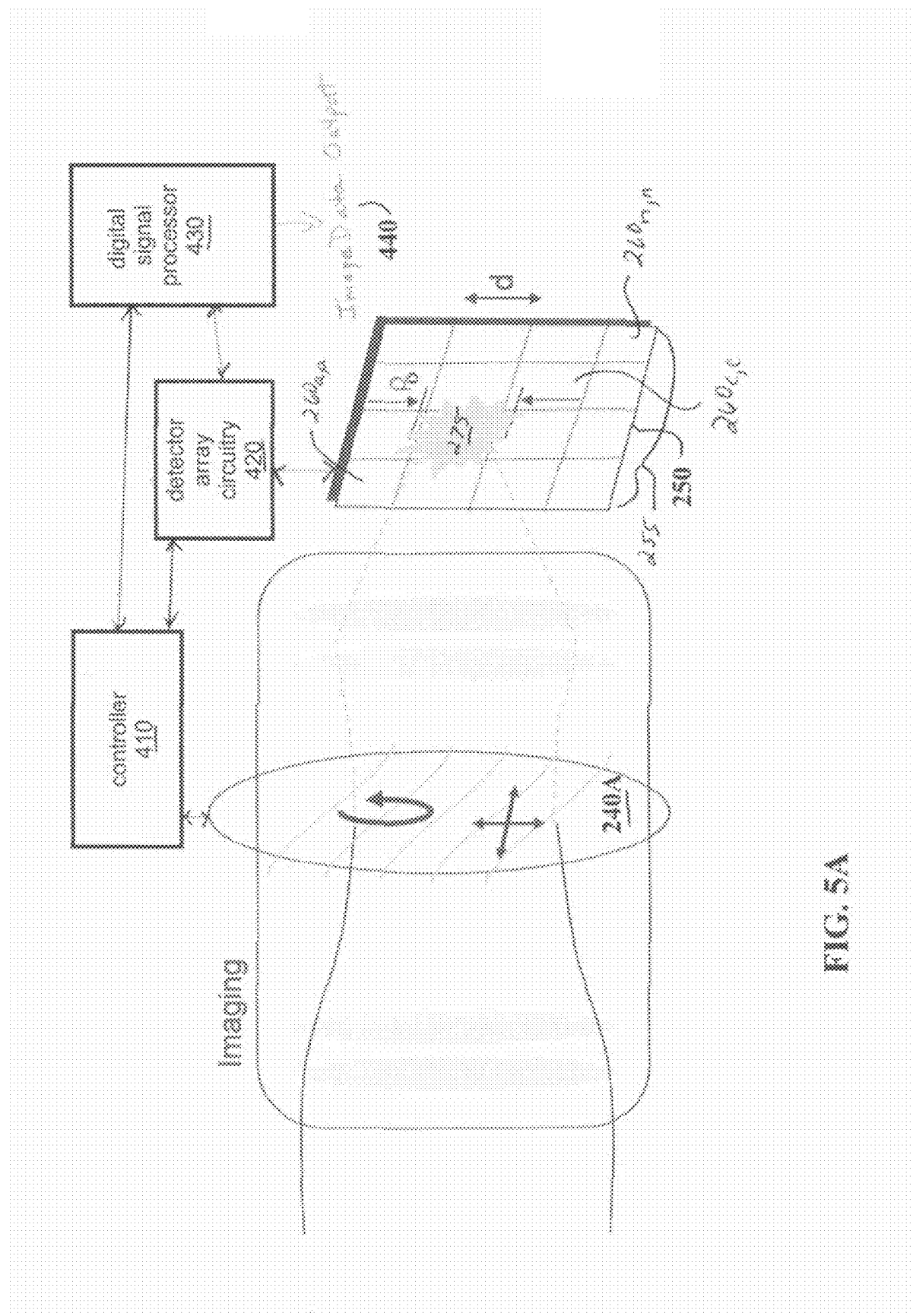
FIGS. 5A-5C are schematic diagrams of a portions of alternative optical systems with distinct phase plate types.
Figure 5B:
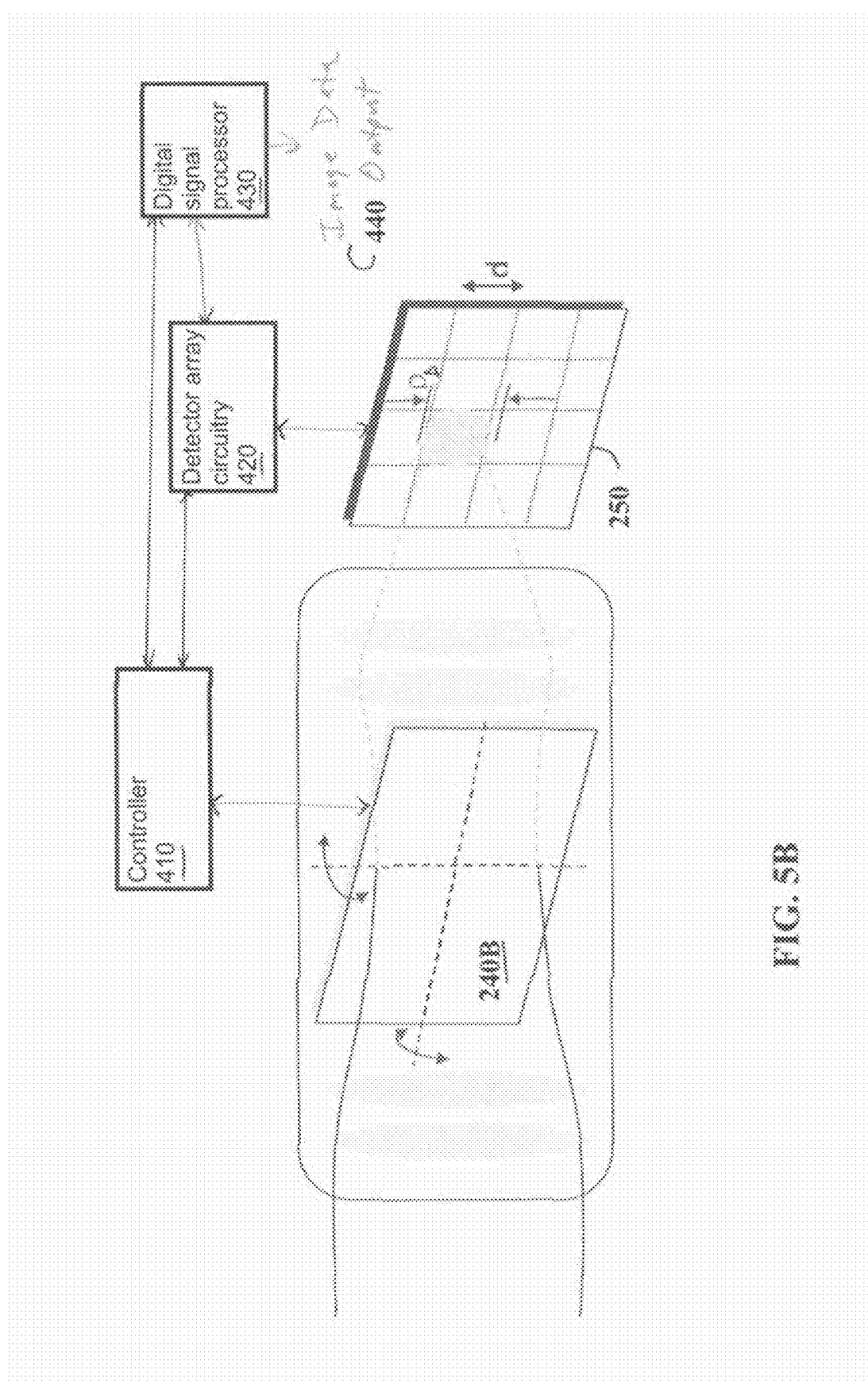
Figure 5C:
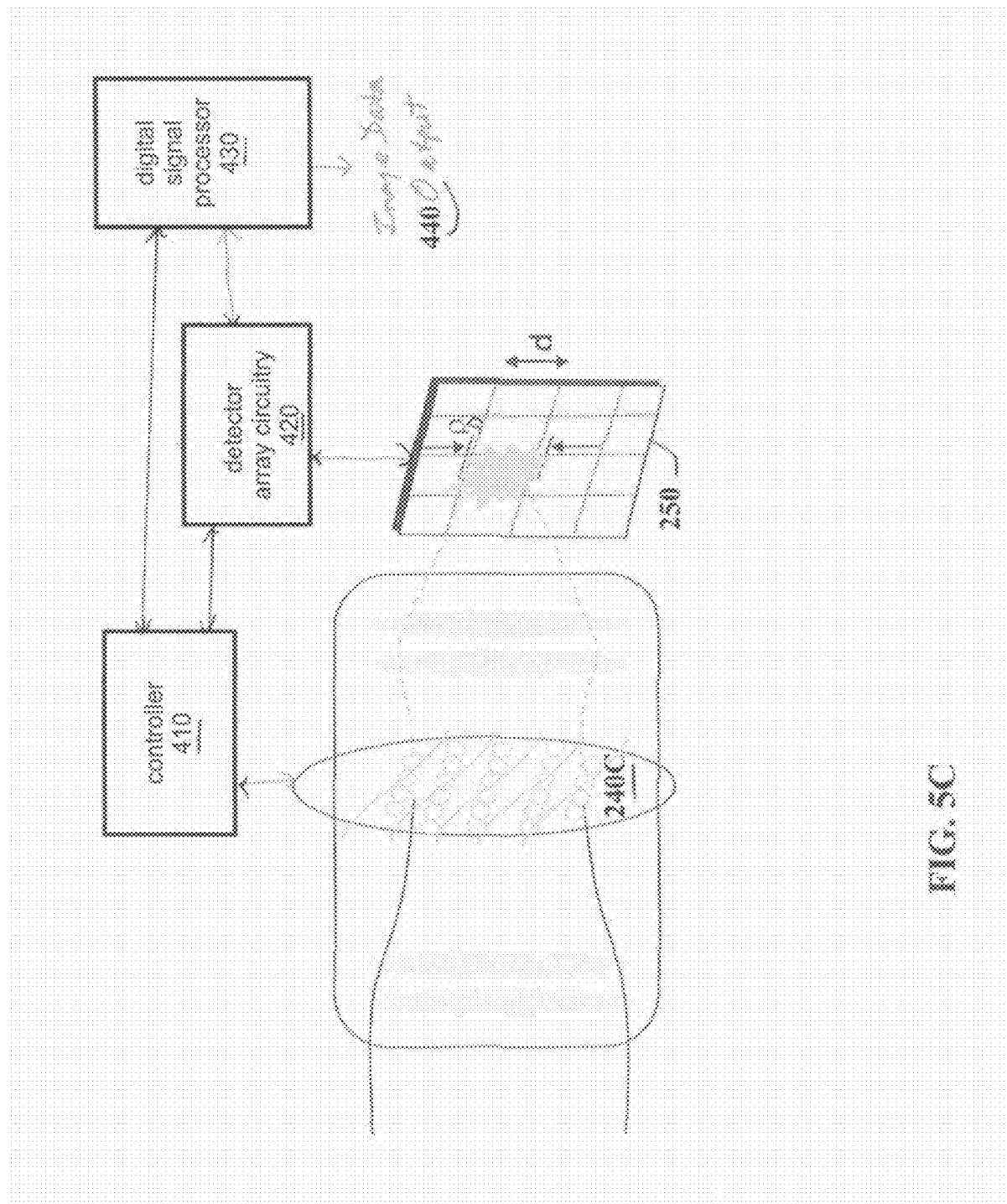

FIGS. 5A through 5C illustrate variable uncalibrated phase plates 240 implemented by a variety of physical systems, including fast steering mirrors, rotating or translating a fixed, optical element with position dependent optical path length variations. In another embodiment, phase plate 240 could be an optical element with programmable path length variations across its spatial extent (e.g., a deformable mirror, acousto-optical modulator array, electro-optical modulator array, etc.). FIG. 5A illustrates an implementation including a rotating or translating phase plate 240A coupled to a controller 410. Controller 410 may also be coupled to detector array circuitry 420 and digital image processor 430, such that synchronization between mechanical actuation of phase plate 240A and signal detection at the detector 250 may be achieved. It may be preferable that mechanical actuation (rotation and/or translation) of phase plate 240A through the optical path occurs relatively quickly.

According to another embodiment shown in FIG. 5B, variable phase plate 240B may be implemented as a two-dimensional fast steering mirror that shifts the wavefront across the detector array 250 to create the blurred image.

In yet another embodiment illustrated in FIG. 5C, variable phase plate 240C may be implemented as a programmable phase plate or deformable mirror. In one example, controller 410 provides control signals to low voltage switching circuits operating a liquid crystal as the optically active phase plate material. Technology for electrical switching of active liquid crystal material is well known to those of ordinary skill in the visible and near infrared signal processing fields. Conventionally, such a phase plate would include an electro-optically active material positioned between two transparent electrodes, at least one of which is patterned so that, when a voltage is applied between the electrodes, the desired pattern of phase modulation is impressed on a wavefront that passes through the modulation plate.

With reference again to FIGS. 1 and 5A, as a consequence of the blurring, triple correlation bispectral restoration techniques may be used to recover and resolve image information from regions much smaller than any single detector $260_{n,n}$. In some examples, multiple sampled data sets are created (Step 140) across the detector array 255, over a short interval of time. In one example, the result of the pupil plane phase plate modulation is that a point source of optical radiation is spread out into a complicated pattern which covers a moderately large group of detector elements, e.g., elements $260_{a,a}$ through $260_{c,c}$. The blurring function h(x,y) may be defined as this extended patch 275 of illumination from a single point source in the far field. In step 150, the detector array 255 (or detector array circuitry 420 associated therewith) transfers to digital signal processor 430 the sampled data sets of the blurred image resulting from the convolution of the source wavefront f(x,y) and blurring function h(x,y) for image processing. In one example, digital signal processor 430 applies bispectral correlation techniques for atmospheric compensation to the sampled data sets, such as, for example, applied described in "Speckle imaging over horizontal paths" Carmen J. Carrano, *High-Resolution Wavefront Control: Methods, Devices and Applications IV*, Proceedings of SPIE Vol. 4825 (2002), the contents of which are hereby incorporated by reference.

Digital signal processor 430 (in Step 160) outputs image data 440 comprised of an unblurred image effectively sampled with an increased sampling parameter Q (i.e., sub-pixel detector information is obtained.) As noted, imaging system resolution, focal plane array sampling, and field of view are a function of the imaging sampling parameter Q, where Q=λ*(focal ratio)/(detector element size). Image aliasing caused by under-sampling an image may be reduced or eliminated by increasing the sampling parameter Q above the diffraction (Nyquist sampling) limit of Q=1, essentially transcending the diffraction limits of the optical system imposed by the number and size of pixels in detector array 255. Thus, the extracted image is enhanced to a higher resolution (i.e., "super-resolution", reducing the minimal resolvable image feature size) than the system would otherwise be capable of delivering, without the deliberate spatial blurring (subpixel shifting) and correlation based image restoration disclosed herein.

It will be appreciated by those skilled in the art, given the benefit of this disclosure, that the digital image processing discussed herein is linear in nature. Thus, according to certain embodiments, the blurring function convolved imagery may only require one pass through the digital image restoration processor 430 to recover the image resolution. This linearity is in striking contrast to conventional computational imaging techniques, which generally require many iterations to recover a high resolution image. Thus, embodiments of the techniques discussed herein may offer a significant reduction in computational burden.

Figures 6A, 6B:
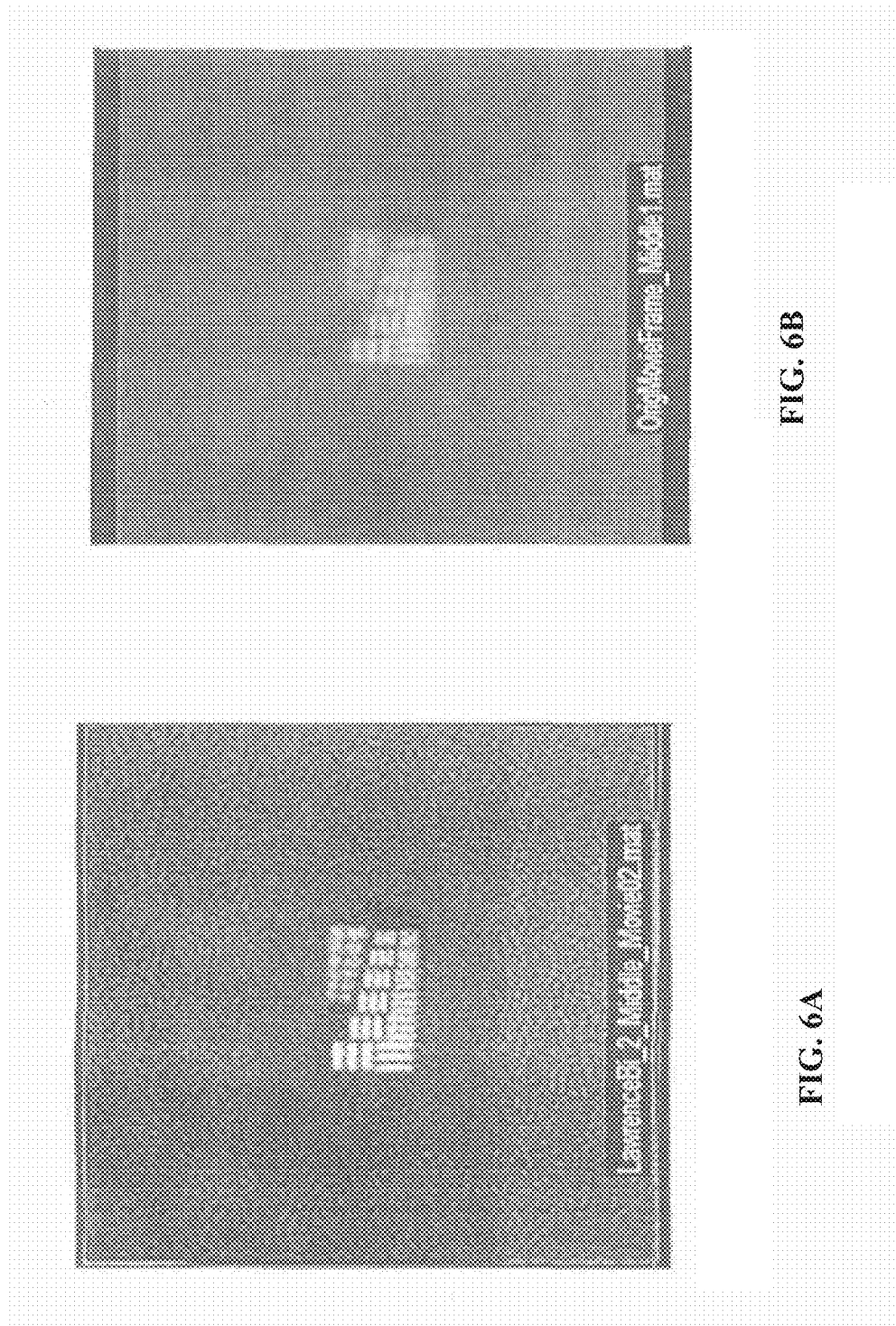
FIGS. 6A and 6B are, respectively, test images processed with and without application of an exemplary uncalibrated phase plate modulation and correlation restoration process.

Proof of concept experiments were performed in real-time, i.e., using 49 frames/second at high definition resolution on a 1280×720 pixel array that demonstrated feasibility and efficacy of the method. FIGS. 6A and 6B illustrate, respectively, test images processed with and without application of the disclosed uncalibrated phase plate modulation and correlation restoration process.

The systems, methods and components disclosed herein, including phase plate controller 410, detector circuity 420 and/or digital signal processor 430, may be implemented in digital electronic circuitry, in computer hardware, firmware, and/or software. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one example, a computer program can be written in any form of programming language, including compiled and/or interpreted languages, and the computer program can be deployed in any form, including as a stand-alone program or as a subroutine, element, and/or other unit suitable for use in a computing environment to carry out the features and functions of various examples discussed herein. A computer program can be deployed to be executed on one computer or on multiple computers at one site.

Method steps or operations can be performed as processes by one or more programmable processors executing a computer program to perform functions of various examples by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implement that functionality.

The phase plate controller 410, detector circuitry 420 and/or digital signal processor 430, may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks). The memory may be a tangible non-transitory computer-readable storage medium having computer-readable instructions stored therein for processing images, which when executed by one or more processors cause the one or more processors to carry out or implement the features and functionalities of various examples discussed herein.

Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The terms "comprise," "include," and/or plural forms of each are open ended and include the listed parts and can include additional parts that are not listed. "And/or" is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method of improving the quality of image processing in an optical imaging system having a system focal plane image sampling parameter Q that is less than 1, the method comprising:
   providing at least one uncalibrated variable phase plate at a pupil plane of the optical imaging system;
   providing a pixel array detector at a focal plane of the optical imaging system;
   receiving an optical radiation wavefront at an entrance aperture of the optical imaging system;
   modifying the received optical radiation wavefront with the at least one uncalibrated variable phase plate and producing a blurred image;
   sampling the blurred image with the pixel array detector to produce a sampled data set; and
   applying a real-time image restoration algorithm to the sampled data set to produce an unblurred image,
   wherein the unblurred image is representative of the received optical radiation wavefront effectively sampled with a sampling parameter greater than the system focal plane image sampling parameter Q, and
   wherein the real-time restoration algorithm comprises a bispectral image restoration algorithm.

2. The method of claim 1, wherein modifying the optical radiation wavefront comprises electronically varying the at least one uncalibrated variable phase plate.

3. The method of claim 1, wherein modifying the optical radiation wavefront comprises mechanically actuating the at least one uncalibrated variable phase plate.

4. The method of claim 1, wherein modifying the received optical radiation wavefront introduces an atmospheric-like blurring to the blurred image.

5. The method of claim 1, wherein the unblurred image is representative of the received optical radiation wavefront effectively sampled with a sampling parameter of 1 or greater.

6. An optical imaging apparatus, comprising:
   an entrance aperture positioned at an entrance of the optical imaging system, the entrance aperture configured to receive an optical radiation wavefront;
   at least one uncalibrated variable phase plate, positioned at a pupil plane of the optical imaging apparatus, optically coupled to the aperture and configured to modify the received optical radiation wavefront to produce a blurred image on a focal plane of the optical imaging system;
   an imaging detector, positioned at the focal plane, including an array of pixels having a pixel pitch and a focal plane image sampling parameter Q that is less than 1, where the focal plane image sampling parameter Q is defined as a ratio of a product of a wavelength of an incident optical radiation wavefront and the focal ratio of the system to the pixel pitch, the imaging detector configured to produce a sampled data set from the blurred image detected by the array of pixels; and a digital image processor coupled to the imaging detector and configured to apply a real-time image restoration algorithm to the sampled data set to produce an unblurred image, wherein the unblurred image is representative of the received optical radiation wavefront effectively sampled with a sampling parameter greater than the system focal plane image sampling parameter Q, and wherein the real-time restoration algorithm comprises a bispectral image restoration algorithm.

7. The optical imaging apparatus of claim 6, wherein the at least one uncalibrated variable phase plate comprises a fast steering mirror mechanism for shifting the optical radiation wavefront in two dimensions at the focal plane.

8. The optical imaging apparatus of claim 6, wherein the at least one uncalibrated variable phase plate comprises a mechanically actuated phase plate.

9. The optical imaging apparatus of claim 6, wherein the at least one uncalibrated variable phase plate comprises an electronically deformable phase plate.

10. The optical imaging apparatus of claim 6, wherein the uncalibrated variable phase plate introduces an atmospheric-like blurring to the blurred image.

11. The optical imaging apparatus of claim 6, wherein the unblurred image is representative of the received optical radiation wavefront effectively sampled with a sampling parameter of 1 or greater.

12. A method of improving the quality of image processing in an optical imaging system having a system focal plane image sampling parameter Q that is less than 1, the method comprising:

providing at least one uncalibrated variable phase plate at a pupil plane of the optical imaging system;

providing a pixel array detector at a focal plane of the optical imaging system;

receiving an optical radiation wavefront at an entrance aperture of the optical imaging system;

modifying the received optical radiation wavefront with the at least one uncalibrated variable phase plate and producing a blurred image;

sampling the blurred image with the pixel array detector to produce a sampled data set; and applying a real-time image restoration algorithm to the sampled data set to produce an unblurred image, wherein the unblurred image is representative of the received optical radiation wavefront effectively sampled with a sampling parameter greater than the system focal plane image sampling parameter Q, and wherein modifying the optical radiation wavefront comprises electronically varying the at least one uncalibrated variable phase plate.

13. The method of claim 12, wherein the real-time restoration algorithm comprises a bispectral image restoration algorithm.

14. The method of claim 12, wherein modifying the received optical radiation wavefront introduces an atmospheric-like blurring to the blurred image.

15. A method of improving the quality of image processing in an optical imaging system having a system focal plane image sampling parameter Q that is less than 1, the method comprising:

providing at least one uncalibrated variable phase plate at a pupil plane of the optical imaging system;

providing a pixel array detector at a focal plane of the optical imaging system;

receiving an optical radiation wavefront at an entrance aperture of the optical imaging system;

modifying the received optical radiation wavefront with the at least one uncalibrated variable phase plate and producing a blurred image;

sampling the blurred image with the pixel array detector to produce a sampled data set; and applying a real-time image restoration algorithm to the sampled data set to produce an unblurred image, wherein the unblurred image is representative of the received optical radiation wavefront effectively sampled with a sampling parameter greater than the system focal plane image sampling parameter Q, and wherein modifying the optical radiation wavefront comprises mechanically actuating the at least one uncalibrated variable phase plate.

16. The method of claim 15, wherein the real-time restoration algorithm comprises a bispectral image restoration algorithm.

17. The method of claim 15, wherein modifying the received optical radiation wavefront introduces an atmospheric-like blurring to the blurred image.

18. A method of improving the quality of image processing in an optical imaging system having a system focal plane image sampling parameter Q that is less than 1, the method comprising:

providing at least one uncalibrated variable phase plate at a pupil plane of the optical imaging system;

providing a pixel array detector at a focal plane of the optical imaging system;

receiving an optical radiation wavefront at an entrance aperture of the optical imaging system;

modifying the received optical radiation wavefront with the at least one uncalibrated variable phase plate and producing a blurred image;

sampling the blurred image with the pixel array detector to produce a sampled data set; and applying a real-time image restoration algorithm to the sampled data set to produce an unblurred image, wherein the unblurred image is representative of the received optical radiation wavefront effectively sampled with a sampling parameter greater than the system focal plane image sampling parameter Q, and wherein modifying the received optical radiation wavefront introduces an atmospheric-like blurring to the blurred image.

19. The method of claim 18, wherein the real-time restoration algorithm comprises a bispectral image restoration algorithm.

20. The method of claim 18, wherein modifying the optical radiation wavefront comprises electronically varying the at least one uncalibrated variable phase plate.

21. The method of claim 18, wherein modifying the optical radiation wavefront comprises mechanically actuating the at least one uncalibrated variable phase plate.

22. An optical imaging apparatus, comprising:

an entrance aperture positioned at an entrance of the optical imaging system, the entrance aperture configured to receive an optical radiation wavefront;

at least one uncalibrated variable phase plate, positioned at a pupil plane of the optical imaging apparatus, optically coupled to the aperture and configured to modify the received optical radiation wavefront to produce a blurred image on a focal plane of the optical imaging system;

an imaging detector, positioned at the focal plane, including an array of pixels having a pixel pitch and a focal plane image sampling parameter Q that is less than 1, where the focal plane image sampling parameter Q is defined as a ratio of a product of a wavelength of an incident optical radiation wavefront and the focal ratio of the system to the pixel pitch, the imaging detector configured to produce a sampled data set from the blurred image detected by the array of pixels; and a digital image processor coupled to the imaging detector and configured to apply a real-time image restoration algorithm to the sampled data set to produce an unblurred image, wherein the unblurred image is representative of the received optical radiation wavefront effectively sampled with a sampling parameter greater than the system focal plane image sampling parameter Q, and wherein the at least one uncalibrated variable phase plate comprises a fast steering mirror mechanism for shifting the optical radiation wavefront in two dimensions at the focal plane.

23. The optical imaging apparatus of claim 22, wherein the real-time restoration algorithm comprises a bispectral image restoration algorithm.

24. The optical imaging apparatus of claim 22, wherein the uncalibrated variable phase plate introduces an atmospheric-like blurring to the blurred image.

25. The optical imaging apparatus of claim 22, wherein the at least one uncalibrated variable phase plate comprises an electronically deformable phase plate.

26. The optical imaging apparatus of claim 22, wherein the at least one uncalibrated variable phase plate comprises a mechanically actuated phase plate.

27. An optical imaging apparatus, comprising:
an entrance aperture positioned at an entrance of the optical imaging system, the entrance aperture configured to receive an optical radiation wavefront;
at least one uncalibrated variable phase plate, positioned at a pupil plane of the optical imaging apparatus, optically coupled to the aperture and configured to modify the received optical radiation wavefront to produce a blurred image on a focal plane of the optical imaging system;
an imaging detector, positioned at the focal plane, including an array of pixels having a pixel pitch and a focal plane image sampling parameter Q that is less than 1, where the focal plane image sampling parameter Q is defined as a ratio of a product of a wavelength of an incident optical radiation wavefront and the focal ratio of the system to the pixel pitch, the imaging detector configured to produce a sampled data set from the blurred image detected by the array of pixels; and
a digital image processor coupled to the imaging detector and configured to apply a real-time image restoration algorithm to the sampled data set to produce an unblurred image,
wherein the unblurred image is representative of the received optical radiation wavefront effectively sampled with a sampling parameter greater than the system focal plane image sampling parameter Q, and
wherein the at least one uncalibrated variable phase plate comprises a mechanically actuated phase plate.

28. The optical imaging apparatus of claim 27, wherein the real-time restoration algorithm comprises a bispectral image restoration algorithm.

29. The optical imaging apparatus of claim 27, wherein the uncalibrated variable phase plate introduces an atmospheric-like blurring to the blurred image.

30. The optical imaging apparatus of claim 27, wherein the at least one uncalibrated variable phase plate comprises a fast steering mirror mechanism for shifting the optical radiation wavefront in two dimensions at the focal plane.

31. An optical imaging apparatus, comprising:
an entrance aperture positioned at an entrance of the optical imaging system, the entrance aperture configured to receive an optical radiation wavefront;
at least one uncalibrated variable phase plate, positioned at a pupil plane of the optical imaging apparatus, optically coupled to the aperture and configured to modify the received optical radiation wavefront to produce a blurred image on a focal plane of the optical imaging system;
an imaging detector, positioned at the focal plane, including an array of pixels having a pixel pitch and a focal plane image sampling parameter Q that is less than 1, where the focal plane image sampling parameter Q is defined as a ratio of a product of a wavelength of an incident optical radiation wavefront and the focal ratio of the system to the pixel pitch, the imaging detector configured to produce a sampled data set from the blurred image detected by the array of pixels; and
a digital image processor coupled to the imaging detector and configured to apply a real-time image restoration algorithm to the sampled data set to produce an unblurred image,
wherein the unblurred image is representative of the received optical radiation wavefront effectively sampled with a sampling parameter greater than the system focal plane image sampling parameter Q, and
wherein the at least one uncalibrated variable phase plate comprises an electronically deformable phase plate.

32. The optical imaging apparatus of claim 31, wherein the real-time restoration algorithm comprises a bispectral image restoration algorithm.

33. The optical imaging apparatus of claim 31, wherein the uncalibrated variable phase plate introduces an atmospheric-like blurring to the blurred image.

34. The optical imaging apparatus of claim 31, wherein the at least one uncalibrated variable phase plate comprises a fast steering mirror mechanism for shifting the optical radiation wavefront in two dimensions at the focal plane.

35. An optical imaging apparatus, comprising:
an entrance aperture positioned at an entrance of the optical imaging system, the entrance aperture configured to receive an optical radiation wavefront;
at least one uncalibrated variable phase plate, positioned at a pupil plane of the optical imaging apparatus, optically coupled to the aperture and configured to modify the received optical radiation wavefront to produce a blurred image on a focal plane of the optical imaging system;
an imaging detector, positioned at the focal plane, including an array of pixels having a pixel pitch and a focal plane image sampling parameter Q that is less than 1, where the focal plane image sampling parameter Q is defined as a ratio of a product of a wavelength of an incident optical radiation wavefront and the focal ratio of the system to the pixel pitch, the imaging detector configured to produce a sampled data set from the blurred image detected by the array of pixels; and
a digital image processor coupled to the imaging detector and configured to apply a real-time image restoration algorithm to the sampled data set to produce an unblurred image, wherein the unblurred image is representative of the received optical radiation wavefront effectively sampled with a sampling parameter greater than the system focal plane image sampling parameter Q, and wherein the uncalibrated variable phase plate introduces an atmospheric-like blurring to the blurred image.

36. The optical imaging apparatus of claim 35, wherein the real-time restoration algorithm comprises a bispectral image restoration algorithm.

37. The optical imaging apparatus of claim 35, wherein the at least one uncalibrated variable phase plate comprises a fast steering mirror mechanism for shifting the optical radiation wavefront in two dimensions at the focal plane.

38. The optical imaging apparatus of claim 35, wherein the at least one uncalibrated variable phase plate comprises a mechanically actuated phase plate.

39. The optical imaging apparatus of claim 35, wherein the at least one uncalibrated variable phase plate comprises an electronically deformable phase plate.

\* \* \* \* \*